United States Patent [19]

Block et al.

[11] Patent Number: 5,827,331
[45] Date of Patent: *Oct. 27, 1998

[54] ELECTRODE COMPOSITIONS

[75] Inventors: Jacob Block, Rockville, Md.; Xiyun Fan, Orange, Tex.

[73] Assignee: W. R. Grace & Co.-Conn., New York, N.Y.

[*] Notice: The term of this patent shall not extend beyond the expiration date of Pat. No. 5,698,147.

[21] Appl. No.: 835,874

[22] Filed: Apr. 8, 1997

Related U.S. Application Data

[63] Continuation-in-part of Ser. No. 653,145, May 24, 1996, abandoned.

[51] Int. Cl.⁶ .................................................. H01M 4/62
[52] U.S. Cl. .................... 29/623.5; 429/217; 429/224
[58] Field of Search .................................. 429/217, 224, 429/218, 212; 29/623.5

[56] References Cited

U.S. PATENT DOCUMENTS

| | | | |
|---|---|---|---|
| 3,918,989 | 11/1975 | Gillman et al. | 136/127 |
| 4,772,407 | 9/1988 | Carlson | 252/74 |
| 5,098,609 | 3/1992 | Iruvanti et al. | 252/511 |
| 5,223,033 | 6/1993 | King et al. | 106/285 |
| 5,358,801 | 10/1994 | Brodd | 429/215 |
| 5,569,520 | 10/1996 | Bates | 429/191 |
| 5,698,147 | 12/1997 | Chern et al. | 264/104 |

OTHER PUBLICATIONS

Peak, "Organic Dispersing Agents", Spec. Chem. (1988(, 8(2), 151,154, 156, 161–2. (no month available.), 1988.

Kim, et al., "Tape Casting of Silicon Nitride", Materials Research Society Fall Meeting, Boston, MA, Dec. 1993.

Kim, Young–Wook et al., Tape Casting of Silicon Nitride Materials Research Society Fall Meeting, Boston, MA, Nov. 1992 (Abstract).

*Primary Examiner*—Kathryn L. Gorgos
*Assistant Examiner*—Carol Chaney
*Attorney, Agent, or Firm*—Howard J. Troffkin

[57] ABSTRACT

An electrode composition for use as an electrode in a non-aqueous battery system. The electrode composition contains an electrically active powder in a solid polymer and, as a dispersant, a $C_8$–$C_{15}$ alkyl capped oligomer of a hexanoic acid that is electrochemically inert at 2.5–4.5 volts.

19 Claims, No Drawings

ELECTRODE COMPOSITIONS

This application is a continuation-in-part of application Ser. No. 08/653,145, filed May 24, 1996, now abandoned.

This invention was made with Government support under contract DE-FC02-91CE 50336 awarded by the United States Department of Energy. The Government has certain rights in this invention.

BACKGROUND OF THE INVENTION

1. Field of the Invention

This invention pertains to battery components, including electrodes, and cells.

2. Description of the Related Art

Storage batteries have a configuration composed of at least one pair of electrodes of opposite polarity and, generally, a series of adjacent electrodes of alternating polarity. The current flow between electrodes is maintained by an electrolyte composition capable of carrying ions across electrode pairs.

Non-aqueous batteries have certain distinct advantages over other types of storage batteries. They use, as anodes, light weight metals, such as alkali metals as for example, lithium metal, lithium oxides, lithium-aluminum alloys and the like which are at the far end of the electromotive series. These batteries have the potential for providing much higher specific energy (gravimetric) and volumetric energy densities (capacity per unit weight and volume, respectively) than other types of batteries, due to the low atomic weight of the metal and high potential for forming a battery in conjunction with suitable positive electrodes far removed from the light weight metal electrode (the description herein will use batteries having lithium as the light weight metal anode although other light weight metals can be used) in the electromotive series. The battery can be formed in any conventional physical design, such cylindrical, rectangular or disc-shaped "button" cells, normally of a closed cell configuration.

The battery components of positive electrode, negative electrode and an electrical insulating material capable of permitting ionic conductivity, such as porous separator membranes or a solid or gel polymer electrolyte located between the electrodes. Batteries formed of these components can be in the form of distinct alternating plates in a sandwich design or of a continuously spirally wound design as are well known.

As disclosed in copending U.S. patent applications, U.S. Ser. No. 08/653,174, now U.S. Pat. No. 5,725,822, U.S. Ser. No. 08/653,173, now U.S. Pat. No. 5,772,934, U.S. Ser. No. 08/653,172, now U.S. Pat. No. 5,799,927, and U.S. Ser. No. 08/653,170, now U.S. Pat. No. 5,698,147, all filed on May 24, 1996 and co-assigned with the present application, which teachings are incorporated herein by reference, methods and battery compositions have been developed which provide a solid polymer electrolyte-electrode composite suitable for light weight metal battery systems.

Briefly, the processes involve forming electrodes composed of active solid material which are co-extruded with solid polymer electrolyte components to provide the resultant electrode-electrolyte composite. Solid material suitable for forming anodes include, for example, carbons capable of intercalating the light weight metal ions within its crystal or other structure, such as graphite or coke and the like. Solid material suitable for forming cathodes are metal chalcogenides having a metal selected from Ti, Zr, Nb, Cu, Fe, Ta, V, Mn, C, Co, Ni and mixtures of these metals alone or together with intercalating metals, such as lithium or sodium. Preferred alkali metal (e.g. lithium) chalcogenides are those of manganese oxides, cobalt oxides, vanadium oxide or nickel oxides or mixtures thereof. The most preferred chalcogenides are lithium manganese dioxide and overlithiated manganese oxides. The electrochemically active material is normally used in combination with minor amounts of up to about 30 wt. % of a conductive carbon based on the total solids. The conductive carbon may be a carbon black, such as acetylene black and usually has a particle size range of from about 1 to 100 $\mu$m.

According to the embodiments disclosed, the solid polymer electrolyte (SPE) is a blend of an electrolyte salt, a binder, and an organic liquid capable of solvating and forming an ionic complex with the salt. The salt is preferably a lithium salt selected from the group consisting of $LiPF_6$, $LiAsF_6$, $LiCF_3SO_3$, and $LiClO_4$ and the like.

The liquids useful in forming the solid polymer electrolyte include the aprotic organic solvents, i.e., not prone to contributing a proton, such as ethylene carbonate, propylene carbonate, dimethyl carbonate, diethyl carbonate, dimethyl adipate, tetramethylene sulfone, $\gamma$-butyrolactone, dimethylformamide, dioctyl phthalate, and dibutyl phthalate and the like and mixtures thereof.

Polymers typically used in SPE's include polyacrylonitrile (PAN), poly(tetraethylene glycol diacrylate) (PEGDA), poly(vinylidene difluoride) (PVDF) and poly(vinyl pyrrolidinone) (PVP) and the like.

The various processes can be used to formulate composite electrolyte-anodes or electrolyte-cathodes, depending on the active electrode material utilized. The compounded composition typically is extruded into a desired shape, such as a sheet, which may be deposited onto a conductive current collector (e.g. a foil or screen of conductive metal) that can be cut into smaller sizes to form electrodes. The electrodes can then be assembled into batteries.

It is highly desirable to have a formulation that results in a final product having the desired characteristics, and one that is easily handled during processing. In extrusion processes, viscosity of the material is an important concern. The viscosity should be high enough to permit good mixing of the components to provide a homogeneous mass, while not being of such high viscosity to cause excessive back pressure in the extruder. At the same time the final product must have a high content of solid active particulate material to provide a suitable electrode.

The formulations and extrusion processes optionally utilize additives to modify various properties of the materials during fabrication, such as viscosity, and to enhance the characteristics of the final product. Typical of the additives used are dispersants. It might be assumed that a wide variety of dispersants might be useful to obtain the desired results. However, it has been found that, although there is a large number of dispersants available, most dispersants do not aid in enhancing the processing characteristics of the complex mixture of solid particulate material and solid polymer electrolyte (SPE) components. The SPE materials are generally fluid, low viscosity compositions under extrusion processing conditions. In addition, a selection of a particular dispersant is not obvious to the artisan when attempting to provide an extruded, highly-filled electrode, due to the many factors that influence the results one obtains with any particular dispersant. Among the factors that influence the results obtained are: (1) the solubility of the dispersant in the polymer electrode systems and/or organic electrolytes that are required in the application; (2) the chemical stability of the dispersant at the electrode potential realizing that many cells are operated at different potentials; (3) the stability of the electrochemically active and electrically conductive materials used in combination with a particular dispersant and under the conditions needed for fabrication; (4) the ability of the dispersant to allow or enhance binding of the active materials and other particulate material into a unitary structure at very low concentrations in order to provide an electrode with good performance; (5) the ability and ease of obtaining a uniform distribution of the dispersant with the binder and active material of the electrode; (6) the ability of the dispersant to remain stable in an electrode capable of undergoing a multiplicity of charge-discharge cyclings; (7) the number and ease of the steps required to obtain the desired electrode; and (8) the safety, availability of the material, and cost.

SUMMARY OF THE INVENTION

The present invention is directed to the addition of dispersants selected from $C_8$–$C_{15}$ alkyl capped oliogomers of $C_5$–$C_7$ alkanoic acids and mixtures thereof. These dispersants are non-active and electrochemically stable (inert electrochemically) and provide a significant viscosity reduction to a feed mixture which has a high content of solid particulate electrochemically active material to enable the formation of an electrolyte-electrode composite product. This enables the obtainment of higher loadings of electrically active powder in the electrode, e.g. $LiMn_2O_4$ in forming a cathode, or carbon in forming an anode. Preferably, the subject dispersants are electrochemically stable at 2.5 to 4.5 volts, most preferably 2.5–4.2 volts, as determined by standard procedures.

DETAILED DESCRIPTION OF THE INVENTION

The present invention is directed to an improved extrusion process to provide high energy electrode-electrolyte composite products. The present process has been found to achieve higher loading of solid active electrode product in which the dispersant is an electrochemically inert material; and which achieves good flow-through processing properties within the extruder.

The electrode compositions to which the present invention has been found suitable are those described in co-pending application Ser. No.08/653,174, U.S. Ser. No.08/653,173, U.S. Ser. No. 08/653,172, and U.S. Ser. No. 08/653,170, which teachings are incorporated herein by reference. The present invention can be used most preferably in the process of the above application having Ser. Nos. 05/653,170, 08/653,174, and 08/653,172.

It has been unexpectedly found that the addition of certain dispersants which are classified as $C_8$–$C_{15}$ alkyl capped oligomers of $C_5$–$C_7$ alkanoic acids or mixtures thereof. These oligomers normally have a free hydroxy terminal group and a $C_8$–$C_{15}$ alkyl ester terminal group although either or both end groups may be capped using a $C_8$–$C_{15}$ fatty alcohol or fatty acid. The oligomer dispersant may be represented by the formula

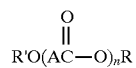

wherein R' and R each independently represent hydrogen atom or a $C_8$–$C_{15}$ hydrocarbyl (preferably a $C_{10}$–$C_{12}$ alkyl) group provided at least one R' or R represents a $C_8$–$C_{15}$ hydrocarbyl group, A represents a $C_5$–$C_7$ alkylene group (preferably $C_6$) and n is an integer of 2 to 8 (preferably 3–5). These dispersants provide a significant viscosity reduction during the extrusion processing of the materials; permit very high loading of solid active material; and provide an electrode in which the dispersant is an inert material therein. The subject dispersant must exhibit electrochemical stability (inertness) at an operating range of from 2.5 to 4.5 volts, most preferably from 2.5 to 4.2 volts, as determined by standard battery operating procedures.

Hypermer® KD1, available from ICI Americas, Inc., is a commercially available material representative of the subject dispersants and has been used to particular benefit. Hypermer® KD1 has been found to be an oligomer of hexanoic acid capped with a $C_{12}$ alkyl ester group. This material, when used as a dispersant in forming polymer electrode compositions, both anode and cathode, produces a significant viscosity reduction without deteriorating the electrochemical performance. This unexpectedly enables one to obtain higher loadings of electrically active powder in the cathode or in the anode, e.g., $LiMn_2O_4$ in a cathode, or carbon in an anode.

The subject dispersant can be premixed with one or more of the components used in forming the desired composite electrolyte-electrode. Normally the dispersant is added as part of the initial feed mixture where more than one feed stream is used. The dispersant is preferably added to the solid active material. The dispersant should be used in from about 1 to about 3 percent of the total composition.

The preferred polymeric dispersant, is Hypermer® KD1. Hypermer dispersants, having different chemical compositions as well as solubility and stability characteristics, have not been found suitable in achieving the desired result. For example, a series of these dispersants are known to have the following characteristics:

(1) HYPERMER® KD1 is an oligomer of hexanoic acid and is used in medium polarity solvents, e.g., ethers, ketones, THF, chlorinated hydrocarbons, and blends of these solvents.

(2) HYPERMER® KD2 is a $C_2$–$C_3$ alkylene oxide copolymer and is used in highly polar solvents, e.g., ethanol, iso-propanol, 2-ethyoxy ethanol and some aqueous systems.

(3) HYPERMER® KD3 is a mixture of alkyl esters of fatty acids and alkylamines and is commonly used in non-polar systems, e.g., mineral spirits, toluene, xylene, paraffin waxes and oils. Additional characteristics of certain Hypermer products are shown in the following Table A:

TABLE A

| Physical Characteristics | | | | |
|---|---|---|---|---|
| HYPER-MER® Polymeric Dispersant | Appearance | Melting Point °C.[1] | Specific Gravity | Viscosity (cps) | Effective Solvent Polarity Range |
| KD1 | Tan colored flakes | Softens 60° C. | 1.05 | N/A | Medium Polar |
| KD2 | Straw colored liquid | N/A | 1.02 | 200–320 at 20° C. | Highly Polar |
| KD3 | Amber liquid/paste | Pourable 25° C. | 0.92 | 1600–2200 at 35° C. | Non-polar |

The nature of the invention will be made clearer by the following examples:

EXAMPLE 1

This example shows how the viscosity of a solid polymer electrolyte (SPE) mixture (without the electrically active component) is determined.

A solid polymer electrolyte composition according to the present invention was prepared, as follows:

Solid Polymer Electrolyte (SPE)

| wt. % | Component |
|---|---|
| 44 | Ethylene Carbonate (Aldrich) |
| 44 | Propylene Carbonate (Grant Chemicals) |
| 6 | Polyacrylonitrile (Eastern Chemical) |
| 6 | Lithium (bis) trifluoromethanesulfonimide (3M) |

The mix was heated to 120° C. while mixing to form a uniform mixture.

The viscosity of the mixture was determined as follows:

A Brookfield RVT-DV-II viscometer was used with a "Thermosel" attachment. The temperature was 125° C. A number 27 spindle was used. The viscosity of this mixture was found to be 150 cp at shear rates between 6.8–34 $sec^{-1}$.

EXAMPLE 2

This example compares the viscosity of the basic SPE mixture of Example 1 with the same mixture containing an electrically active component ($LiMn_2O_4$), such as would be used to form an electrolyte-electrode composite according to the present invention.

$LiMn_2O_4$ powder (obtained from the Davison Chemical Division of W. R. Grace & Co.) (20.17 parts per 10 parts SPE) was added to the mixture of Example 1, and the viscosity was determined as in Example 1. The viscosity was found to have increased to 12,500 cp at 6.8 $sec^{-1}$. At 3.4 $sec^{-1}$, the viscosity was 16,400 cp, and at 0.85 $sec^{-1}$, the viscosity was 76,800 cp.

EXAMPLE 3

This example shows the effect of various organic-soluble dispersants on the viscosity of the electrolyte-electrode mixture of Example 2.

Various commercially available dispersants were added to the mixture of Example 2, and the viscosity determined as in Example 1. The results are summarized in Table I.

TABLE I

| Dispersant | Dosage (g/10 g SPE = 20.17 g LiMn2O4) | Viscosity cp | Shear Rate ($sec^{-1}$) |
|---|---|---|---|
| Hypermer ® KD1 (ICI) | 0.2 | 6,200 | 3.4 |
| Hypermer ® KD3 (ICI) | 0.2 | 20,200 | 3.4 |
| OLOA 1200 Chevron | 0.2 | 21,800 | 3.4 |
| Hypermer ® KD2 (ICI) | 0.2 | 57,200 | 0.85 |

These results show that only the oligomer dispersant of the present invention, as represented by Hypermer® KD1 produced a significant viscosity reduction, whereas the other dispersants actually increased viscosity.

EXAMPLE 4

This example shows the effect of the addition of acetylene black to the SPE mixture, such as would be added to form an electrolyte-electrode composite according to the present invention.

Acetylene black (Chevron)(1.36 parts) was added to 20 parts of SPE from Example 1. The rheology of this mix was determined at 125° C. using a number 29 spindle. The results are summarized in Table II below.

TABLE II

| Shear Rate ($sec^{-1}$) | Viscosity (cp) |
|---|---|
| 1.7 | 180,000 |
| 0.85 | 276,000 |
| 0.34 | 468,000 |
| 0.17 | 772,000 |

EXAMPLE 5

This example shows the effect of the subject oligomer dispersant on the viscosity of the mixture of Example 4.

Hypermer® KD1 (0.2 parts) was added to the mixture of Example 4, and viscosity measured at 125° C. with a number 29 spindle. The results are summarized in Table III below.

TABLE III

| Shear Rate ($sec^{-1}$) | Viscosity (cp) | % Reduction |
|---|---|---|
| 1.7 | 32,600 | 82 |
| 0.85 | 51,000 | 82 |
| 0.34 | 115,000 | 75 |
| 0.17 | 240,000 | 69 |

The results show a 69–82% viscosity reduction with Hypermer® KD1.

EXAMPLE 6

This example shows the effect of $LiMn_2O_4$ addition on the viscosity of SPE and acetylene black.

To the mixture described in Example 4 (33.6 parts SPE, 1.9 parts acetylene black) was added 25.5 parts $LiMn_2O_4$. The viscosity was determined at 125° C. with a number 29 spindle and is summarized in Table IV below.

TABLE IV

| Shear Rate ($sec^{-1}$) | Viscosity (cp) |
|---|---|
| 1.7 | 142,000 |
| 0.85 | 233,000 |
| 0.34 | 370,000 |
| 0.17 | 750,000 |

EXAMPLE 7

This example shows the effect of the subject oligomer dispersant on the mixture of Example 6.

To the mixture of Example 6 was added 0.67 parts of Hypermer® KD1. The viscosity was determined as in Example 6. The results are summarized in Table V below.

TABLE V

| Shear Rate ($sec^{-1}$) | Viscosity (cp) | % Reduction |
|---|---|---|
| 1.7 | 24,400 | 83 |
| 0.85 | 24,400 | 89 |
| 0.34 | 64,000 | 83 |
| 0.17 | 134,000 | 83 |

These results show that Hypermer® KD1 reduces the viscosity of a cathode mixture 82–90%.

EXAMPLE 8

This example shows the effect of the subject oligomer dispersant on the viscosity reduction of the anode formulations. Table VI lists the formulations of each anode sample which were tested, the sample mixing conditions using the Haake Torque Rheometer, the sample viscosity measured at four different shear rates using the Instron capillary rheometer, and the sample viscosity drop due to the addition of the Hypermer® KD1 at 2200 1/sec shear rate.

a) As shown in Table VI, Row 1 and 2, adding 1.5 w % of Hypermer® KD1 to an anode mixture having 45 v % solid loading results in a 46% viscosity reduction.

b) As shown in Table VI, Row 1 and 3, adding 2.0 w % of Hypermer® KD1 to an anode mixture having 45 v % solid loading results in a 62% viscosity reduction.

c) As shown in Table VI, Row 4 and 5, adding 1.66 w % of Hypermer® KD1 to an anode mixture having 50 v % solid loading results in a 9% viscosity reduction.

d) As shown in Table VI, Row 4 and 6, adding 2.6 w % of Hypermer® KD1 to an anode mixture having 50 v % solid loading results in a 48% viscosity reduction.

lations. Table III lists the formulations of each cathode sample being tested, the sample mixing conditions using the Haake Torque Rheometer, the sample viscosity measured at four different shear rates using the Instron capillary rheometer, and the sample viscosity drop due to the addition of the Hypermer® KD1 at 2200 1/sec shear rate.

a) As shown in Table VII, Rows 1 and 2, adding 2.0 w % of Hypermer® KD1 to a cathode mixture having 45 v % solid loading results in a 12% viscosity reduction.

b) As shown in Table VII, Rows 3 and 4, adding 3.0 w %, of Hypermer® KD1 to a cathode mixture having 48 v % solid loading results in a 50% viscosity reduction.

c) As shown in Table VII, Rows 5 and 6, adding 3.0 w % of Hypermer® KD1 to acathode mixture having 50 v % solid loading results in a 59% viscosity reduction.

TABLE VI

The effect of Hypermer ® KD1 on the anode viscosity drop.
ANODE HAAKE/INSTRON DATA

| | FORMULATION | | | MIXING CONDITION | | | Instron visc. (poise) at | | | | |
|---|---|---|---|---|---|---|---|---|---|---|---|
| | solid | | | Wt % Hypermer | temp | | time | 125° C. at shear rate (1/sec) | | | | % visc drop at |
| Line No. | vol % | wt % | wt % SPE | KD1 | (°C.) | rpm | (min) | 220 | 730 | 2200 | 7300 | 2200 (1/sec) |
| (1) | 45.0 | 58.0 | 42.0 | 0 | 115 | 110 | 12 | 2100 | 1060 | 534 | 245 | 0 |
| (2) | 45.0 | 58.0 | 41.5 | 1.5 | 115 | 110 | 10 | 1385 | 508 | 290 | 112 | 46 |
| (3) | 45.0 | 58.0 | 40.0 | 2.0 | 115 | 110 | 10 | 1245 | 490 | 204 | 103 | 62 |
| (4) | 50 | 63.0 | 37.0 | 0 | 115 | 110 | 15 | 3260 | 1500 | 760 | 400 | 0 |
| (5) | 50 | 63.0 | 35.34 | 1.66 | 115 | 110 | 32 | 3840 | 1560 | 690 | 365 | 9 |
| (6) | 50 | 63.0 | 34.4 | 2.60 | 135 | 110 | 20 | 1600 | 686 | 396 | 250 | 48 |

EXAMPLE 9

This example shows the effect of the subject oligomer dispersant on the viscosity reduction of the cathode formud) As shown in Table VII, Rows 5 and 7, adding 4.0 w % of Hypermer® KD1 to a cathode mixture having 50 v % solid loading results in a 61% viscosity reduction.

TABLE VII

The effect of Hypermer ® KD1 on the cathode viscosity drop.
ANODE HAAKE/INSTRON DATA

| | FORMULATION | | | MIXING CONDITION | | | Instron visc. (poise) at | | | | |
|---|---|---|---|---|---|---|---|---|---|---|---|
| | solid | | | Wt % Hypermer | temp | | time | 125° C. at shear rate (1/sec) | | | | % visc drop at |
| Line No. | vol % | wt % | wt % SPE | KD1 | (°C.) | rpm | (min) | 220 | 730 | 2200 | 7300 | 2200 (1/sec) |
| (1) | 45.0 | 71.0 | 29.0 | 0 | 120 | 110 | 12 | 3320 | 1320 | 620 | 300 | 0 |
| (2) | 45.0 | 71.0 | 27.0 | 2.0 | 120 | 110 | 12 | 2200 | 1216 | 545 | 246 | 12 |
| (3) | 48.0 | 73.0 | 27.0 | 0 | 120 | 110 | 12 | 5000 | 2170 | 1150 | 470 | 0 |
| (4) | 48.0 | 73.0 | 24.0 | 3.0 | 120 | 110 | 10 | 2560 | 1150 | 570 | 300 | 50 |
| (5) | 50 | 75.0 | 25.C | 0 | 120 | 50 | 30 | 6000 | 2850 | 1600 | 650 | 0 |

TABLE VII-continued

The effect of Hypermer ® KD1 on the cathode viscosity drop.
ANODE HAAKE/INSTRON DATA

| | FORMULATION | | | Wt % | MIXING CONDITION | | | Instron visc. (poise) at 125° C. at shear rate (1/sec) | | | | % visc drop at |
|---|---|---|---|---|---|---|---|---|---|---|---|---|
| | solid | | | Hypermer | temp | | time | | | | | |
| Line No. | vol % | wt % | wt % SPE | KD1 | (°C.) | rpm | (min) | 220 | 730 | 2200 | 7300 | 2200 (1/sec) |
| (6) | 50 | 75.0 | 22.0 | 3.0 | 120 | 110 | 2C | 3270 | 1150 | 656 | 310 | 59 |
| (7) | 50 | 75.0 | 21.0 | 4.0 | 120 | 110 | 2C | 2580 | 1200 | 622 | 320 | 61 |

EXAMPLE 10

This example shows the effect of the subject oligomer dispersant on the anode film processability and film quality. Table VIII lists the formulations used in the extrusion/calendering process and the processing results in terms of film thickness (Film H), film width (Film W), and die flow uniformity and film dimensional stability. Table IX gives the corresponding extrusion/calendering conditions used for each of the runs.

b) As shown in Table VIII, row 3 and 4, adding 1.66% Hypermer® KD1 to an anode mixture having 50 v % solid loading greatly improve the processability. Without Hypermer® KD1 this material was not extrudable due to a very high viscosity caused by the high solid loading. Adding 1.66% Hypermer® KD1 achieved a film having 4–5 mil thick and 7–8 inches wide.

TABLE VIII

Effect of Hypermer ® KD1 on the Anode Film Processing.

| | FORMULATION | | Blank H | Film H | Blank W | Film W | RESULTS | |
|---|---|---|---|---|---|---|---|---|
| Line No. | Solid Loading | Hypermer ® W % | Mil | Mil | Inch | Inch | Die Flow | Film Dimension Stability |
| (1) | 45 V % (58 W %) | 0 | 15–20 | 3–5 | 7–8 | Varied | Full die flow, but uneven edge tearing due to a slow flow rate. | Film width varied. |
| (2) | 45 V % (58 W %) | 0.5 | 10 | 4–5 | 4 | 4 | Full die flow, fairly even and stable. | Film width was fairly stable at 4 inches. |
| (3) | 50 V % (63 W %) | 0 | — | — | — | — | Extruder jammed. | — |
| (4) | 50 V % (63 W %) | 1.66 | 25–30 | 4–5 | 7–8 | varied | Full die flow, uneven, edge slow. | Film width varied. |

TABLE IX

Anode Extrusion and Calendering Conditions[1]

| | | EXTRUDER | | | | | DIE | | CALENDER | | |
|---|---|---|---|---|---|---|---|---|---|---|---|
| Line No. | FORMULATION | Temp(1–5) (°C.) | Screw (RPM) | Feed (#/hr) | TQ (%) | Pressure (psi) | Temp (°C.) | Gap (mil) | Roll T(°F.) top/bot | Nip gap (mil) | Roll V (ft/min) |
| (1) | 45.0 v % (58 w %) 0% Hypermer ® KD1 | 115-115-115-110-75 | 130 | 17–25 | 14 | 760 | 121 | 3 | 45/240 | 1–1.5 | 5–15 |
| (2) | 45.0 v % (58 w %) 0.5% Hypermer ® KD1 | 123-123-120-95-75 | 130 | 17–25 | 10 | 650–530 | 125 | 1.5–2 | 45/240 | 1–1.5 | 20 |
| (3) | 50 v % (63 w %) 0% Hypermer ® KD1 | 120-120-120-95-75 | 130 | 17–25 | 12 | >2400 Extruder jammed | 125 | 3 | 45/240 | 1–1.5 | 5–15 |
| (4) | 50 v % (63 w %) 1.66% Hypermer ® KD1 | 121-121-121-95-75 | 130 | 17–25 | 11 | 810 | 126 | 3 | 45/240 | 1–1.5 | 8–15 |

[1]The corresponding processing results are given in Table VIII, under the same line number.

a) As shown in Table VIII, row 1 and 2 adding 0.5% Hypermer® KD1 to an anode mixture having 45 v % solid loading reduced the blank thickness from 15–20 mil to 10 mil, and improved the die flow uniformity, and the film width dimensional stability.

EXAMPLE 11

This example shows the effect of the subject oligomer dispersant on the cathode film processability and film quality. Table X lists the formulations used in the extrusion/ calendering process and the film processing results in terms of film thickness (Film H), film width (Film W), as well as die flow uniformity and film dimensional stability. Table XI gives the corresponding extrusion/calendering conditions used in each of the runs.

a) As shown in Table XI, row 1 and 2, adding 2% Hypermer® KD1 to a cathode mixture having 45 v % solid loading improved the die flow uniformity thus improved the film width stability.

b) As shown in Table XI, row 3 and 4, adding 3.0% Hypermer® KD1 to a cathode mixture having 48 v % solid loading greatly improve the processability. Without Hypermer® KD1 the die flow was very uneven, and large portion of the die was blocked due to high viscosity of the material. Adding 3% Hypermer® KD1 greatly reduced the die blocking, improved the die flow uniformity, and stabilized the process. We were able to get a film with 7 inch wide and the process was fairly stable and lasted for 20 minutes.

EXAMPLE 12

This example shows that the subject oligomer dispersant does not adversely affect cell performance. Cells were prepared with and without Hypermer® KD1. The data in the following Table XII are the average performances of three control cells and three Hypermer® KD1 cells, respectively. Both cells were made with 5 $\mu$m coke (Conoco). At cycle 30, the Hypermer® KD1 cells have an average capacity of 6.3 mAh, with a current efficiency of 100% (within the error of the measurement). There has been no measurable degradation since cycle 5.

TABLE X

Effect of Hypermer ® KD1 on Cathode Film Processing

| | FORMULATION | | Blank H | Film H | Blank W | Film W | RESULTS | |
|---|---|---|---|---|---|---|---|---|
| Line No. | Solid Loading | Hypermer ® W % | Mil | Mil | Inch | Inch | Die Flow | Film Dimension Stability |
| (1) | 45.4 V % (71 W %) | 0 | 12–15 | 4–7 | 4.5 | varied | Die blocked seriously. Uneven flow, strips. | Film width varied considerably. |
| (2) | 45.4 V % (71 W %) | 2 | 10–12 | 8–9 | 6 | 6.5 | Die flow was fairly even and stable. Die edge blocked. | Film width was fairly stable at 6.5 inches. |
| (3) | 48 V % (73 W %) | 0 | 15–16 | 4–7 | 4–2 | varied | Die blocked seriously. Severe, uneven flow. | Film width varied considerably. |
| (4) | 48 V % (73 W %) | 3 | 13–15 | 9–10 | 7 | 7.5 | Die flow was fairly even and stable. | Film width was fairly stable at 7.5 inches. The process continued for 20 minutes. |

TABLE XI

Cathode Extrusion and Calendering Condition[1]

| | | EXTRUDER | | | | | DIE | | CALENDER | | |
|---|---|---|---|---|---|---|---|---|---|---|---|
| Line No. | FORMULATION | Temp(1–5) (°C.) | Screw (RPM) | Feed (#/hr) | TQ (%) | Pressure (psi) | Temp (°C.) | Gap (mil) | Roll T(°F.) top/bot | Nip gap (mil) | Roll V (ft/min) |
| (1) | 45.4 v % (71 w %) 0% Hypermer ® KD1 | 118-118-110-95-75 | 130 | 45–60 | 49–56 | 450–550 | 128 | 3 | 45/240 | 1–2 | 13 |
| (2) | 45.4 v % (71 w %) 2% Hypermer ® KD1 | 120-120-120-95-75 | 130 | 37 | 10 | 380–400 | 115 | 2–3 | 45/240 | 1–2 | 8–10 |
| (3) | 48 v % (73 w % ) 0% Hypermer ® KD1 | 134-127-124-117-104 | 160 | 60–50 | 46 | 2100–900 | 130–135 | 3 | 45/240 | 1–2 | |
| (4) | 48 v % (73 w %) 3% Hypermer ® KD1 | 118-118-110-95-75 | 150 | 38–60 | 15 | 670–690 | 120 | 3 | 45/240 | 1–2 | 11–13 |

[1]The corresponding processing results are given in Table X under the same line number.

TABLE XII

| Cell | Theoretical Capacity (LiC$_6$) | Capacity (LiMn$_2$O$_4$) (100 mAh/g) | Capacity Cycle 1 | Efficiency Cycle 1 | Capacity Cycle 5 | Efficiency Cycle 5 |
|---|---|---|---|---|---|---|
| Control | 22 mAh | 11.3 Mah | 6.2 mAh | 54.6% | 7.8 mAh | 96.8% |
| Control + 2% Hypermer ® KD1 | 13.7 | 12.1 | 4.7 | 54.3 | 6.3 | 98.7 |

Although the present invention has been described in relation to particular embodiments thereof, many other variations and modifications and other uses will become apparent to those skilled in the art. The present invention is to be limited not by the specific disclosure herein, but only by the appended claims.

What is claimed is:

1. A cathodic electrode composition comprising an alkali metal chalcogenide or mixtures thereof, a solid polymer electrolyte composed of electrolyte salt, solid polymer binder and organic liquid capable of solvating and complexing with the electrolyte salt, and a C$_{12}$ alkyl ester capped oligomer of hexanoic acid that is electrochemically inert.

2. The cathodic electrode composition of claim 1 wherein the alkali metal of said alkali metal chalcogenide is lithium.

3. The cathodic electrode composition of claim 2 wherein the alkali metal chalcogenide is selected from lithium manganese dioxide, overlithiated manganese dioxide and mixtures thereof.

4. The cathodic electrode composition of claim 3 wherein said composition comprises ethylene carbonate, propylene carbonate, polyacrylonitrile, lithium (bis) trifluoromethanesulfonimide, a chalcogenide selected from lithium manganese dioxide, overlithiated manganese dioxide and mixtures thereof, acetylene black and said C$_{12}$ alkyl ester capped oligomer.

5. The cathodic electrode composition of claim 1 wherein said oligomer is electrochemically inert at from 2.5 to 4.5 volts.

6. An anodic electrode composition comprising an electrochemically active powder composed of carbon capable of having lithium intercalated within its structure, a solid polymer electrolyte composed of electrolyte salt, solid polymer binder and organic liquid capable of solvating and complexing with the electrolyte salt, and a C$_{12}$ alkyl ester capped oligomer of hexanoic acid that is electrochemically inert.

7. The anodic electrode composition of claim 6 wherein said oligomer is electrochemically inert at from 2.5 to 4.5 volts.

8. The anodic electrode composition of claim 4 wherein the solid polymer electrolyte is comprised of ethylene carbonate, propylene carbonate, polyacrylonitrile and lithium (bis) trifluoromethanesulfonimide.

9. The composition of claim 6 wherein the oligomer is represented by the formula $$R'O(AC-O)_nR$$

wherein A is hexylene, R is C$_{12}$ alkyl, R' is selected from hydrogen or a C$_8$–C$_{15}$ hydrocarbyl and n is an integer of 2 to 8.

10. The composition of claim 1 wherein the oligomer is represented by the formula $$R'O(AC-O)_nR$$

wherein A is hexylene, R is C$_{12}$ alkyl, R' is selected from hydrogen or a C$_8$–C$_{15}$ hydrocarbyl and n is an integer of 2 to 8.

11. A process for forming high energy electrode-electrolyte sheet product comprising extruding a composition comprising an alkali metal chalcogenide or mixtures thereof, a solid polymer electrolyte composed of electrolyte salt, solid polymer binder and organic liquid capable of solvating and complexing with the electrolyte salt, and a C$_{12}$ alkyl ester capped oligomer of hexanoic acid that is electrochemically inert.

12. The process of claim 11 wherein the alkali metal chalcogenide is lithium.

13. The process of claim 12 wherein the alkali metal chalcogenide is selected from lithium manganese dioxide, overlithiated manganese dioxide and mixtures thereof.

14. The process of claim 12 wherein said composition comprises ethylene carbonate, propylene carbonate, polyacrylonitrile, lithium (bis) trifluoromethanesulfonimide, a chalcogenide selected from lithium manganese dioxide, overlithiated manganese dioxide and mixtures thereof, acetylene black and said C$_{12}$ alkyl ester capped oligomer.

15. The process of claim 11 wherein said oligomer is electrochemically inert at from 2.5 to 4.5 volts.

16. A process of forming high energy electrode-electrolyte sheet product comprising extruding a composition comprising an electrochemically active powder composed of carbon capable of having lithium intercalated within its structure, a solid polymer electrolyte composed of electrolyte salt, solid polymer binder and organic liquid capable of solvating and complexing with the electrolyte salt, and a C$_{12}$ alkyl ester capped oligomer of hexanoic acid that is electrochemically inert.

17. The process of claim 16 wherein said oligomer is electrochemically inert at from 2.5 to 4.5 volts.

18. The process of claim 11 further comprising positioning a current collector within the sheet product.

19. The process of claim 16 further comprising positioning a current collector within the sheet product.

* * * * *